United States Patent
Kojima et al.

(10) Patent No.: US 12,212,901 B2
(45) Date of Patent: Jan. 28, 2025

(54) APPARATUS, MONITORING SYSTEM, METHOD, AND COMPUTER-READABLE MEDIUM

(71) Applicant: Yokogawa Electric Corporation, Tokyo (JP)

(72) Inventors: Osamu Kojima, Tokyo (JP); Jun Naraoka, Tokyo (JP); Toshiaki Takahashi, Tokyo (JP); Daiki Kato, Tokyo (JP); Takaaki Ogawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 234 days.

(21) Appl. No.: 17/730,181

(22) Filed: Apr. 26, 2022

(65) Prior Publication Data

US 2022/0368862 A1   Nov. 17, 2022

(30) Foreign Application Priority Data

May 12, 2021   (JP) ................ 2021-081013

(51) Int. Cl.
*H04N 9/87* (2006.01)
*G06N 20/00* (2019.01)
(Continued)

(52) U.S. Cl.
CPC .............. *H04N 9/87* (2013.01); *G06T 9/00* (2013.01); *H04N 19/154* (2014.11); *G06N 20/00* (2019.01); *H04N 19/00* (2013.01)

(58) Field of Classification Search
None
See application file for complete search history.

(56) References Cited

U.S. PATENT DOCUMENTS 5,598,354 A * 1/1997 Fang .................. G06T 9/002
    708/203
6,438,267 B1   8/2002 Kondo
(Continued)

FOREIGN PATENT DOCUMENTS

JP   H07184062 A   7/1995
JP   H11187407 A   7/1999
(Continued)

OTHER PUBLICATIONS

Office Action issued for counterpart Japanese Application No. 2021-081013, transmitted from the Japanese Patent Office on Aug. 8, 2023 (drafted on Aug. 3, 2023).

*Primary Examiner* — Stefan Gadomski

(57) ABSTRACT

Provided is an apparatus comprising: an image acquisition unit configured to acquire a captured image; a compression unit configured to compress a captured image to generate compressed data; a reproduction unit configured to generate, from the compressed data, a reproduced image that reproduces the captured image; an evaluation acquisition unit configured to acquire an evaluation corresponding to a degree of approximation between the reproduced image and the captured image; and a learning processing unit configured to perform learning processing of a model configured to output, in response to an input of a new captured image, a compression parameter value to be applied in compression of the captured image, by using learning data including the evaluation, a captured image corresponding to the evaluation, and a compression parameter value applied in compression of the captured image.

7 Claims, 4 Drawing Sheets

(51) Int. Cl.
*G06T 9/00* (2006.01)
*H04N 19/00* (2014.01)
*H04N 19/154* (2014.01)

(56) References Cited

U.S. PATENT DOCUMENTS

| | | | | |
|---|---|---|---|---|
| 8,743,954 | B1* | 6/2014 | Masterson | H04N 19/124 |
| | | | | 375/240.05 |
| 10,319,114 | B2* | 6/2019 | Bastani | G06F 3/147 |
| 11,178,395 | B1* | 11/2021 | Swaminathan | H04N 19/156 |
| 2008/0037880 | A1* | 2/2008 | Lai | H04N 19/64 |
| | | | | 375/240 |
| 2010/0124275 | A1* | 5/2010 | Yeh | H04N 21/658 |
| | | | | 375/240.07 |
| 2011/0085602 | A1* | 4/2011 | He | H04N 21/4425 |
| | | | | 375/E7.026 |
| 2011/0182343 | A1* | 7/2011 | Saito | H04N 19/61 |
| | | | | 375/E7.279 |
| 2011/0188567 | A1* | 8/2011 | Blum | H04L 1/0017 |
| | | | | 375/E7.154 |
| 2012/0308146 | A1* | 12/2012 | Uchida | H04N 19/154 |
| | | | | 382/232 |
| 2014/0085477 | A1 | 3/2014 | Takano | |
| 2018/0176570 | A1* | 6/2018 | Rippel | G06V 30/18057 |
| 2018/0176576 | A1* | 6/2018 | Rippel | G06V 30/19167 |
| 2018/0176578 | A1* | 6/2018 | Rippel | G06N 20/00 |
| 2019/0130542 | A1 | 5/2019 | Tichelaar | |
| 2020/0053408 | A1* | 2/2020 | Park | H04N 19/59 |
| 2020/0186796 | A1* | 6/2020 | Mukherjee | H04N 19/107 |
| 2020/0267416 | A1* | 8/2020 | Hodgkinson | H04N 19/85 |
| 2020/0374522 | A1 | 11/2020 | Zhou | |
| 2020/0389658 | A1* | 12/2020 | Kim | H04N 19/184 |
| 2021/0037250 | A1* | 2/2021 | Makar | H04N 19/174 |
| 2021/0125380 | A1* | 4/2021 | Lee | H04N 19/117 |
| 2021/0166346 | A1* | 6/2021 | Kim | H04N 19/115 |
| 2021/0166434 | A1* | 6/2021 | Miyauchi | H04N 19/124 |
| 2021/0192792 | A1* | 6/2021 | Baick | G06T 7/11 |
| 2022/0038747 | A1* | 2/2022 | Lee | H04N 19/154 |
| 2023/0130410 | A1* | 4/2023 | Luo | H04N 19/147 |
| | | | | 382/232 |
| 2023/0232017 | A1* | 7/2023 | De | H04N 19/154 |
| | | | | 382/159 |
| 2023/0319321 | A1* | 10/2023 | Ickin | H04N 21/6473 |
| | | | | 382/253 |

FOREIGN PATENT DOCUMENTS

| | | |
|---|---|---|
| JP | 2006109251 A | 4/2006 |
| JP | 2013093668 A | 5/2013 |
| JP | 2019512954 A | 5/2019 |
| JP | 2020191077 A | 11/2020 |
| WO | 2012160902 A1 | 11/2012 |

* cited by examiner

APPARATUS, MONITORING SYSTEM, METHOD, AND COMPUTER-READABLE MEDIUM

The contents of the following Japanese patent application(s) are incorporated herein by reference:
2021-081013 filed in JP on May 12, 2021

BACKGROUND

1. Technical Field

The present invention relates to an apparatus, a monitoring system, a method and a computer-readable medium.

2. Related Art

Patent Document 1 describes "a vehicle monitoring apparatus comprising a monitoring level judgment means for detecting a vehicle or a situation around the vehicle and judging a monitoring level of the vehicle, based on the detected vehicle situation, a monitoring image generation means for calculating a compression rate, based on the judged monitoring level, and generating a monitoring image obtained by compressing a captured image captured by a camera installed in the vehicle with the calculated compression rate, and a transmission means for transmitting information including the generated monitoring image to an external terminal apparatus".

PRIOR ART DOCUMENT

Patent Document: International Publication No. WO2012-160902

SUMMARY

A first aspect of the present invention provides an apparatus. The apparatus may comprise an image acquisition unit configured to acquire a captured image. The apparatus may comprise a compression unit configured to compress a captured image to generate compressed data. The apparatus may comprise a reproduction unit configured to generate, from the compressed data, a reproduced image that reproduces the captured image. The apparatus may comprise an evaluation acquisition unit configured to acquire an evaluation corresponding to a degree of approximation between the reproduced image and the captured image. The apparatus may comprise a learning processing unit configured to perform learning processing of a model configured to output, in response to an input of a new captured image, a compression parameter value to be applied in compression of the captured image, by using learning data including the evaluation, a captured image corresponding to the evaluation, and a compression parameter value applied in compression of the captured image.

A second aspect of the present invention provides a monitoring system. The monitoring system may comprise the apparatus of the first aspect. The monitoring system may comprise a monitoring terminal configured to sense an abnormality in an image capturing region by using the compressed data transmitted from the apparatus. The monitoring terminal may include a determination unit configured to analyze the compressed data and to determine whether an abnormality has occurred in the image capturing region.

A third aspect of the present invention provides a method. The method may comprise an image acquisition step of acquiring a captured image. The method may comprise a compression step of compressing a captured image to generate compressed data. The method may comprise a reproduction step of generating, from the compressed data, a reproduced image that reproduces the captured image. The method may comprise an evaluation acquisition step of acquiring an evaluation corresponding to a degree of approximation between the reproduced image and the captured image. The method may comprise a learning processing step of performing learning processing of a model configured to output, in response to an input of a new captured image, a compression parameter value to be applied in compression of the captured image, by using learning data including the evaluation, a captured image corresponding to the evaluation, and a compression parameter value applied in compression of the captured image.

A fourth aspect of the present invention provides a computer-readable medium having recorded thereon a program. The program may be configured to cause a computer to function as an image acquisition unit configured to acquire a captured image. The program may be configured to cause the computer to function as a compression unit configured to compress a captured image to generate compressed data. The program may be configured to cause the computer to function as a reproduction unit configured to generate, from the compressed data, a reproduced image that reproduces the captured image. The program may be configured to cause the computer to function as an evaluation acquisition unit configured to acquire an evaluation corresponding to a degree of approximation between the reproduced image and the captured image. The program may be configured to cause the computer to function as a learning processing unit configured to perform learning processing of a model configured to output, in response to an input of a new captured image, a compression parameter value to be applied in compression of the captured image, by using learning data including the evaluation, a captured image corresponding to the evaluation, and a compression parameter value applied in compression of the captured image.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

1. Security System 1

Figure 1:
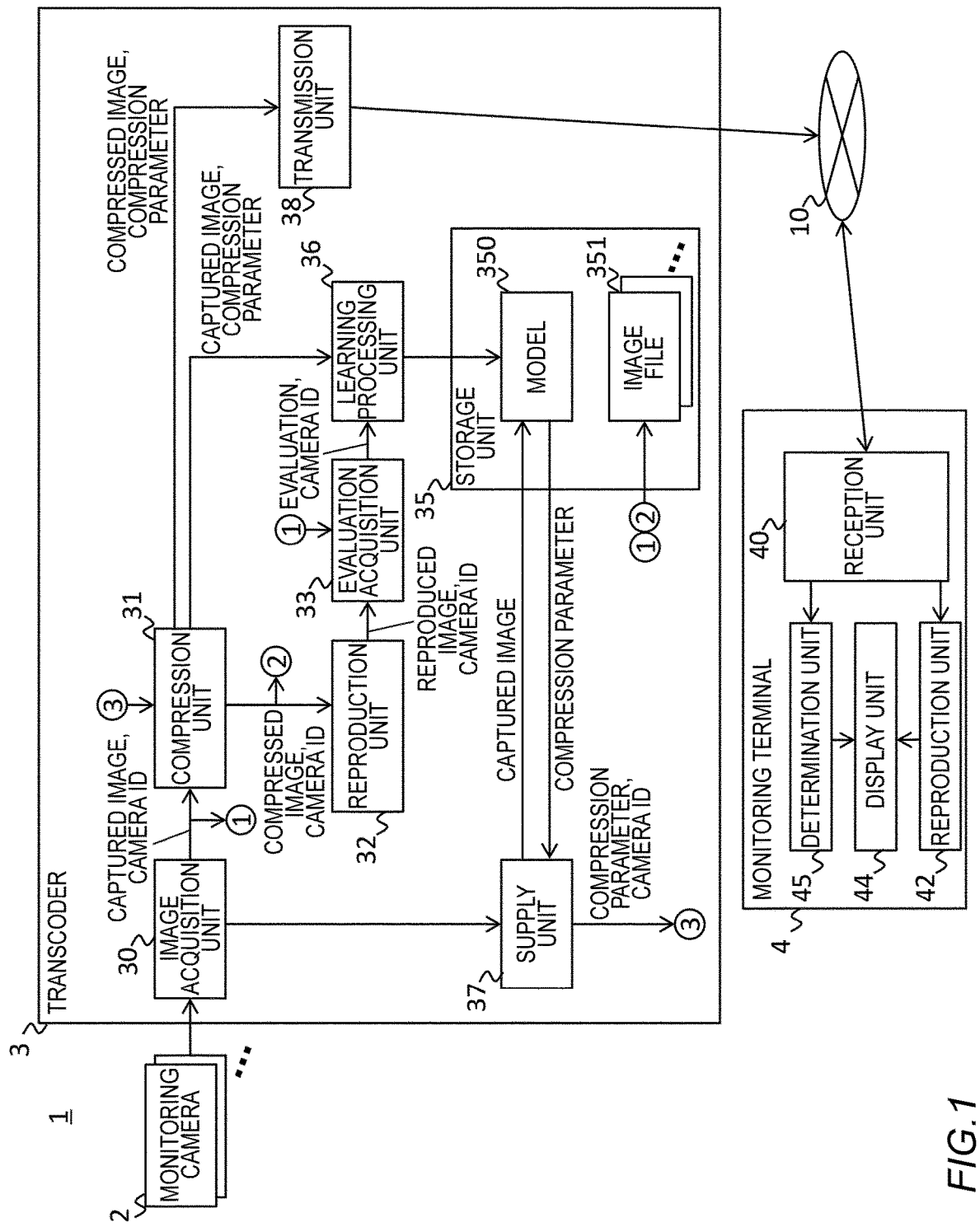
FIG. 1 shows a security system 1 according to an embodiment.

FIG. 1 shows a security system 1 according to the present embodiment. The security system 1 comprises one or more monitoring cameras 2, a transcoder 3, and a monitoring terminal 4.

The transcoder 3 and the monitoring terminal 4 may be connected to each other via a communication network 10. The communication network 10 may be configured to include various networks such as the Internet, a wide area network (WAN), and a local area network, or a combination thereof. The communication network 10 may include a connection point by at least one of wired or wireless manners. The communication network 10 may also be implemented by a dedicated line separated from a public line such as the Internet.

[1.1. Monitoring Camera 2]

Each monitoring camera 2 is an example of the camera, and is configured to perform image capturing of an image capturing region to generate a captured image. Each monitoring camera 2 may be configured to supply an image that has been captured (also referred to as a 'captured image') to the transcoder 3. The image may be a moving image, and the monitoring camera 2 may be configured to always perform the image capturing to generate moving image (also referred to as video) data. For example, each monitoring camera 2 may be configured to perform image capturing at 30 fps. A time stamp may be added to each frame of the captured image. Note that, the image may also be a still image. In this case, the monitoring camera 2 may be configured to perform image capturing at a regular timing and to generate a still image. The monitoring camera 2 may be a visible light camera, or may be an infrared or ultraviolet (X-ray as an example) camera. In a case where the security system 1 is provided with a plurality of monitoring cameras 2, each monitoring camera 2 may be different from each other in terms of a type (as an example, a manufacturer or a model number).

Each monitoring camera 2 may be arranged on a road, a parking lot, a lamp or a utility pole, and may also be arranged at an entrance/exit, a passage or the like of a facility. In a case where the security system 1 is provided with the plurality of monitoring cameras 2, each monitoring camera 2 may be different from each other in terms of an installation position and an image capturing region.

Note that, the facility may be a plant, or may be a school, a house, a station, an airport, a museum, a hospital or a store (a restaurant, as an example), or may also be a theme park, an amusement park or establishments for attraction thereof. Examples of the plant may include a plant for managing and controlling wells such as a gas field and an oilfield and surroundings thereof, a plant for managing and controlling hydroelectric, thermo-electric and nuclear power generations and the like, a plant for managing and controlling environmental power generation such as solar power and wind power, a plant for managing and controlling water and sewerage, a dam and the like, and the like, in addition to chemical and bio industrial plants and the like.

[1.2. Transcoder 3]

The transcoder 3 is an example of the apparatus, and is arranged between the monitoring camera 2 and the monitoring terminal 4. The transcoder 3 may be configured to compress the captured image from each monitoring camera 2 and to supply the same to the monitoring terminal 4. The transcoder 3 comprises an image acquisition unit 30, a compression unit 31, a reproduction unit 32, an evaluation acquisition unit 33, a storage unit 35, a learning processing unit 36, a supply unit 37, and a transmission unit 38.

[1.2(1). Image Acquisition Unit 30]

The image acquisition unit 30 is configured to acquire a captured image. The image acquisition unit 30 may be configured to acquire captured images from the plurality of monitoring cameras 2. Note that, in the present embodiment, as an example, the image acquisition unit 30 is directly connected to each monitoring camera 2, but may also be connected via the communication network 10.

The image acquisition unit 30 may be configured to supply the acquired captured image to the compression unit 31, the learning processing unit 36, the storage unit 35, and the supply unit 37. When the image acquisition unit 30 acquires the captured images from the plurality of monitoring cameras 2, the image acquisition unit may be configured to add identification information (also referred to as 'camera ID') of the monitoring cameras 2 to the captured images to be supplied.

[1.2(2). Compression Unit 31]

The compression unit 31 is configured to compress the captured image to generate compressed data. In the present embodiment, as an example, the compression unit 31 may be configured to generate a compressed image as the compressed data. In addition, the compression unit 31 may be configured to perform compression irreversibly.

The compression unit 31 may be configured to change a compression parameter value to sequentially generate compressed images. Further, when the compression parameter value is supplied from the supply unit 37, which will be described later, the compression unit 31 may be configured to apply the compression parameter value to generate a compressed image. The compression unit 31 may be configured to perform compression within each frame included in the captured image as a moving image, or may be configured to perform compression within continuous frames. For example, the compression unit 31 may be configured to generate, as the compressed data, a moving image obtained by thinning out frames from the captured image. The compression parameter value may be a value indicating at least one of a compression rate, a resolution, the number of gradations, or a frame rate. The same time stamp as that of the frame of the corresponding captured image may be added to each frame of the compressed image.

The compression unit 31 may be configured to compress each of the captured images from the plurality of monitoring cameras 2. In this case, the compression unit 31 may be configured to add the camera ID to the compressed image.

The compression unit 31 may be configured to supply the compressed image to the reproduction unit 32, the storage unit 35 and the transmission unit 38. Further, the compression unit 31 may be configured to supply the compression parameter value used for generation of the compressed image and the captured image before compression corresponding to the compressed image to the learning processing unit 36.

[1.2(3). Reproduction Unit 32]

The reproduction unit 32 is configured to generate a reproduced image that reproduces the captured image, from the compressed data (compressed image as an example, in the present embodiment). When the moving image obtained by thinning out frames by the compression unit 31 is generated as a compressed image, the reproduction unit 32 may be configured to generate a moving image that reproduces the thinned-out frames, as a reproduced image. Note that, in the present embodiment, as an example, since the compressed image is irreversibly compressed, the reproduced image may not match the captured image. The same time stamp as that of the frame of the corresponding compressed image may be added to each frame of the reproduced image. Further, the same camera ID as that of the corresponding compressed image may be added to the reproduced image. The reproduction unit 32 may be configured to supply the generated reproduced image to the evaluation acquisition unit 33.

[1.2(4). Evaluation Acquisition Unit 33]

The evaluation acquisition unit 33 is configured to acquire an evaluation corresponding to a degree of approximation between the reproduced image and the captured image. The evaluation acquisition unit 33 may be configured to calculate a degree of approximation between the captured image supplied from the image acquisition unit 30 and the reproduced image supplied from the reproduction unit 32, and to calculate the evaluation from the calculated degree of approximation. The evaluation acquisition unit 33 may be configured to calculate a degree of approximation between the reproduced image generated from the compressed data and the captured image that is a source of the compressed data. In the present embodiment, as an example, the evaluation acquisition unit 33 may be configured to calculate a degree of approximation between the captured image and the reproduced image corresponding to the same time stamp and camera ID.

A degree of approximation between images may be a value calculated by a conventionally known method, and may be, for example, a degree of coincidence of analysis results by image analysis. The evaluation corresponding to the degree of approximation may be a binary value of a positive evaluation indicating that the degree of approximation between the captured image and the reproduced image is equal to or higher than a lower limit degree of approximation and a negative evaluation indicating that the degree of approximation is lower than the lower limit degree of approximation degree. The lower limit degree of approximation may be the lowest degree of approximation of degrees of approximation with which a user can check whether an abnormality has occurred in the image capturing region by seeing the reproduced image, or may be arbitrarily set. The user may be an operator or a security guard who operates the monitoring terminal 4. The evaluation acquisition unit 33 may be configured to supply the acquired evaluation to the learning processing unit 36 together with the time stamp and the camera ID added to the reproduced image.

[1.2(5). Storage Unit 35]

The storage unit 35 is configured to store a variety of information. The storage unit 35 may be configured to store a model 350 and one or more image files 351.

The model 350 is configured to output, in response to an input of a new captured image, a compression parameter value to be applied in compression of the captured image. The model 350 may be subjected to learning processing by the learning processing unit 36. Note that, the model 350 may be any conventionally known machine learning algorithm, such as a neural network, random forest, gradient boosting, logistic regression, and a support vector machine (SVM).

The image file 351 is configured to store the compressed image supplied from the compression unit 31 for each monitoring camera 2. The image file 351 may also be configured to further store the captured image before compression. The storage unit 35 may be configured to erase the captured image after a shorter period, as compared to that for the compressed image. For example, the storage unit 35 may be configured to erase the captured image after a first period (as an example, one hour or one day) has elapsed since storing the captured image. The storage unit 35 may be configured to erase the compressed image after a second period (as an example, one week or one month), which is longer than that for the captured image, has elapsed since storing the compressed image.

[1.2(6). Learning Processing Unit 36]

The learning processing unit 36 is configured to perform learning processing of the model 350 by using learning data including an evaluation acquired by the evaluation acquisition unit 33, a captured image corresponding to the evaluation, and a compression parameter value applied in compression of the captured image. The learning processing unit 36 may be configured to perform learning processing of the model 350 stored in the storage unit 35.

Here, the captured image corresponding to the evaluation may be a captured image, which corresponds to the time stamp and the camera ID supplied together with the evaluation from the evaluation acquisition unit 33, among the captured images supplied from the compression unit 31 to the learning processing unit 36. The compression parameter value applied in compression of the captured image may be the compression parameter value supplied together with the captured image from the compression unit 31.

[1.2(7). Supply Unit 37]

The supply unit 37 is configured to supply a captured image newly acquired by the image acquisition unit 30 to the model 350 subjected to the learning processing by the learning processing unit 36. The supply unit 37 may be configured to supply, to the compression unit 31, the compression parameter value output from the model 350. Thereby, the compression parameter value, which is output from the model 350, in response to the supply of the new captured image by the supply unit 37, is applied by the compression unit 31, and a compressed image is generated from the new captured image. When the captured images of the plurality of monitoring cameras 2 are supplied from the image acquisition unit 30, the supply unit 37 may be configured to supply the camera IDs added to the captured images to the compression unit 31 in association with the compression parameter value, thereby causing the same to be applied to compression of the captured images to which the camera IDs are added.

[1.2(8). Transmission Unit 38]

The transmission unit 38 is configured to transmit the compressed data (compressed image as an example, in the present embodiment) to the monitoring terminal 4. The transmission unit 38 may be configured to sequentially supply the compressed images supplied from the compression unit 31 to the monitoring terminal 4 via the communication network 10.

[1.3. Monitoring Terminal 4]

The monitoring terminal 4 is configured to sense an abnormality in the image capturing region by using the compressed data (compressed image as an example, in the present embodiment) transmitted from the transcoder 3. The monitoring terminal 4 includes a reception unit 40, a reproduction unit 42, a display unit 44, and a determination unit 45.

[1.3(1). Reception Unit 40]

The reception unit 40 is configured to receive the compressed data (compressed image as an example, in the present embodiment) from the transcoder 3. The reception unit 40 may be configured to supply the received compressed image to the reproduction unit 42 and the determination unit 45.

[1.3(2). Reproduction Unit 42]

The reproduction unit 42 is configured to generate a reproduced image from the compressed data (compressed image as an example, in the present embodiment), in response to an operation from the user. When the compressed images of the plurality of monitoring cameras 2 are supplied from the reception unit 40, the reproduction unit 42 may be configured to generate a reproduced image from each of the compressed images. The reproduction unit 42 may be configured to generate a reproduced image in the same manner as the reproduction unit 32 of the transcoder 3, and may be configured to cause the display unit 44 to display the generated reproduced image. When an operation to instruct generation of a reproduced image is not performed by the user, the reproduction unit 42 may be configured not to generate a reproduced image.

[1.3(3). Display Unit 44]

The display unit 44 is configured to display the reproduced image. When the reproduced images of the plurality of monitoring cameras 2 are supplied from the reproduction unit 42, the display unit 44 may be configured to display the reproduced images together.

[1.3(4). Determination Unit 45]

The determination unit 45 is configured to analyze the compressed data (compressed image as an example, in the present embodiment) and to determine whether an abnormality has occurred in the image capturing region. A determination result may be a binary value of a value indicating that an abnormality has occurred and a value indicating that an abnormality has not occurred, or may be a value of a ratio between 0 and 1 indicating a degree of certainty that an abnormality has occurred.

When a preset detection target is detected in the image capturing region, the determination unit 45 may be configured to determine that the image capturing region is abnormal. In this case, the determination unit 45 may be configured to generate feature data indicating a feature of the detection target. The determination unit 45 may be configured to supply the determination result to the display unit 44 and to cause the display unit to display the same. When the detection target is detected, the determination unit 45 may be configured to further supply the feature data thereof to the display unit 44 and to cause the display unit to display the same.

Here, the detection target may be a photographic subject (also referred to as a target photographic subject) to be detected, among photographic subjects that may exist in the image capturing region. The target photographic subject may be a photographic subject to be noted for security reasons, among photographic subjects that can be detected by image analysis. For example, the target photographic subject may be at least one of a person's face, the whole body of a person (as an example, an adult or a child), clothes, a vehicle (as an example, a running vehicle or a stopped vehicle), a vehicle type, a vehicle color, a license plate, or a specific object (as an example, a bag, a weapon). Further, the target photographic subject may also be a face of a specific person or a specific vehicle.

In a case where the target photographic subject is a person's face, the feature data may indicate a feature of the face in an image. The feature of the face in the image may also be a positional relationship of feature points of the face, a color of eyes, skin, and hair, a color and a shape of an accessory (as an example, glasses and piercings), and the like. In addition, in a case where the target photographic subject is a vehicle, the feature data may indicate a vehicle type of the vehicle in an image. Further, in a case where the target photographic subject is a license plate, the feature data may indicate a license number of a vehicle in an image.

An image of an analysis target for which the determination unit 45 performs image analysis may be a frame extracted from a moving image as a reproduced image. Note that, the determination unit 45 may be a model obtained by machine learning such as deep learning, but is not limited thereto. In addition, the detection target by the determination unit 45 may also be an operation performed over a plurality of frames (as an example, an operation of stealing a commercial product). In this case, the determination unit 45 may be configured to supply the display unit 44 with a determination result, which indicates that the image capturing region is abnormal, and feature data, which indicates a feature of the photographic subject that has performed an operation, in response to detection of a specific operation, and to cause the display unit to display the same.

According to the above-described transcoder 3, an evaluation corresponding to a degree of approximation between a reproduced image reproduced from compressed data (compressed image as an example, in the present embodiment) and a captured image that is a source of the compressed data is acquired, and the learning processing of the model 350 configured to output, in response to an input of a new captured image, a compression parameter value to be applied in compression of the captured image, is performed by using learning data including the evaluation, a captured image corresponding to the evaluation, and a compression parameter value applied in compression of the captured image. Therefore, the compression parameter value output from the model 350 to which the captured image is input is used to compress the captured image, so that compressed data with high reproducibility can be generated.

In addition, the compression parameter value is changed, so that the compressed data is sequentially generated. Therefore, the learning processing of the model 350 can be performed by using learning data including a plurality of compression parameter values having different values and an evaluation corresponding to a degree of approximation between a captured image and a reproduced image when the compression parameter values are applied. Therefore, the compressed data with high reproducibility can be reliably generated.

Further, the captured image is irreversibly compressed to generate the compressed data. Therefore, it is possible to generate compressed data with a small amount of data. Therefore, the captured image is irreversibly compressed by using the compression parameter value output from the model 350 to which the captured image is input, so that compressed data with high reproducibility and a small amount of data can be generated.

Further, a moving image obtained by thinning out frames from the captured image is generated as compressed data, and a moving image that reproduces the thinned-out frames is generated as a reproduced image. Therefore, by using, in the learning processing, the evaluation corresponding to the degree of approximation between the reproduced image and the captured image and the compression parameter value applied to the compression, it is possible to generate compressed data with high reproducibility with respect to the captured image before the frame thinning.

Further, the compression parameter value that is output from the model 350, in response to supply of a newly acquired captured image, is applied to the model 350 subjected to the learning processing by the learning processing unit 36, so that compressed data is generated from the new captured image. Therefore, compressed data with high reproducibility can be appropriately generated from the newly acquired captured image.

Further, since the compressed data is transmitted to the monitoring terminal 4, it is possible to monitor the image capturing region with the monitoring terminal 4.

Further, since the monitoring terminal 4 analyzes the compressed data and determines whether an abnormality has occurred in the image capturing region, it is possible to sense an abnormality from the compressed image. Further, since the reproduced image is generated from the compressed data, in response to the operation from the user, it is possible to prevent the reproduced image from being generated unnecessarily.

2. Operations

[2.1. Learning Step]

Figure 2:
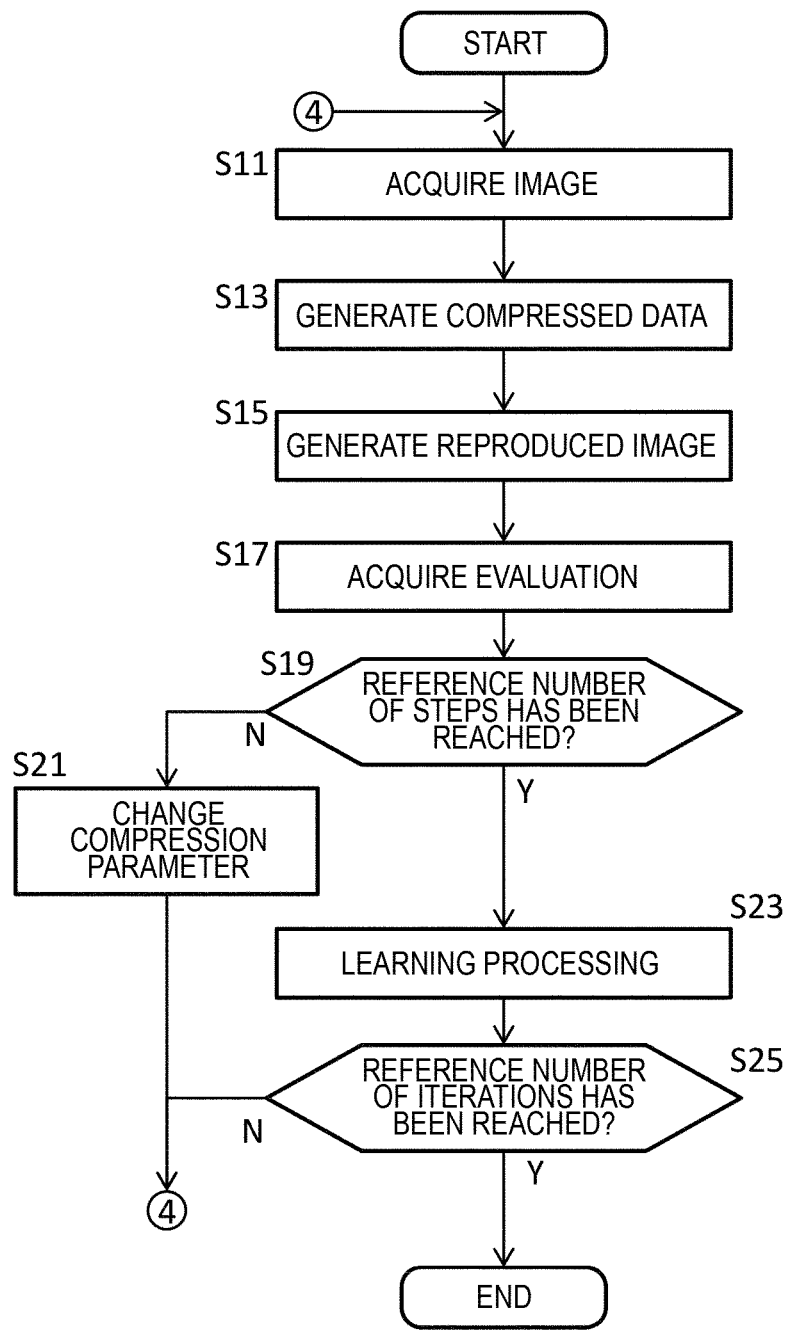
FIG. 2 shows an operation in a learning step of the security system 1 according to the embodiment.

FIG. 2 shows an operation in a learning step of the security system 1 according to the present embodiment. The transcoder 3 of the security system 1 learns the model 350 by performing processing of steps S11 to S25.

First, in step S11, the image acquisition unit 30 acquires a captured image from each monitoring camera 2.

In step S13, the compression unit 31 compresses the captured image to generate compressed data (compressed image as an example, in the present embodiment). The compression unit 31 may compress the captured image within a period for which it is not compressed, among the acquired captured images. For example, in a case where the processing of step S13 is first performed, the compression unit 31 may compress the entire captured images so far. In a case where the processing of step S11 and thereafter is repeated and the processing of step S13 is iteratively performed, the compression unit 31 may compress the captured image in a period after the captured image compressed in the previous processing of step S13.

In addition, in a case where the processing of step S13 is first performed, the compression unit 31 may apply an initial value of a preset compression parameter value to generate compressed data. In a case where the processing of step S11 and thereafter are repeated and the processing of step S13 is performed multiple times, the compression unit 31 may apply a compression parameter value set in step S21, which will be described later, to generate the compressed data. The compression unit 31 may apply a same compression parameter value or separate compression parameter values to the captured images from the plurality of monitoring cameras 2.

In step S15, the reproduction unit 32 generates a reproduced image that reproduces the captured image, from the compressed data (compressed image as an example, in the present embodiment). The reproduction unit 32 may generate a reproduced image by restoring the captured image from the compressed image by a conventionally known method.

In step S17, the evaluation acquisition unit 33 acquires an evaluation corresponding to a degree of approximation between the reproduced image and the captured image. In the present embodiment, as an example, the evaluation acquisition unit 33 calculates a degree of approximation between the reproduced image and the captured image, and acquires an evaluation by comparing the calculated degree of approximation and the lower limit degree of approximation, but may also acquire the degree of approximation and the evaluation from an external computation apparatus or the like.

In step S19, the learning processing unit 36 determines whether the processing of step S17 has been performed by a reference number of steps. When it is determined that the processing has not been performed by the reference number of steps (step S19: No), the processing proceeds to step S21. When it is determined in step S19 that the processing has been performed by the reference number of steps (step S19: Yes), the processing proceeds to step S23.

In step S21, the compression unit 31 changes the compression parameter value that is applied to the compression. Thereby, the changed compression parameter value is applied in step S13 described above, so that compressed data (compressed image as an example, in the present embodiment) is generated. Then, the processing of steps S11 to S17 is repeated, so that learning data, which includes the evaluation corresponding to the degree of approximation between the reproduced image and the captured image, a captured image corresponding to the evaluation, and the compression parameter value applied in compression of the captured image, is generated by the reference number of steps.

Note that, the compression unit 31 may increase or decrease the compression parameter value until a negative evaluation is acquired by the evaluation acquisition unit 33. For example, when a negative evaluation is not acquired by the evaluation acquisition unit 33 in the processing of step S17, the compression unit 31 may change any one (also referred to as 'first type parameter') of a compression rate, a resolution, a number of gradations, and a frame rate indicated by the compression parameter values in one direction of increase or decrease each time the processing of step S21 is performed. When a negative evaluation is acquired by the evaluation acquisition unit 33 in the processing of step S17, the compression unit 31 may change the first type parameter, which has been changed in one direction until then, in an opposite direction, or may increase or decrease any other one, which is different from the first type parameter, of the compression rate, the resolution, the number of gradations, and the frame rate indicated by the compression parameter values.

The compression unit 31 may change continuously or discontinuously, i.e., stepwise the compression parameter value each time the processing of step S21 is performed. When changing discontinuously the compression parameter value, the compression unit 31 may set an amount of change constant each time the processing of step S21 is performed, or may not set the same constant.

In step S23, the learning processing unit 36 performs learning processing of the model 350 by using learning data including an acquired evaluation, a captured image corresponding to the evaluation, and a compression parameter value applied in compression of the captured image.

The learning processing unit 36 may perform the learning processing so that a compression parameter value to be applied so as to generate compressed data of an evaluation that is not negative is output from the model 350, in response to an input of a new captured image to the model 350. For example, the learning processing unit 36 may perform the learning processing of the model 350 so that a compression parameter value to be applied in compression is between a compression parameter value of compressed data corresponding to a positive evaluation and a compression parameter value of compressed data corresponding to a negative evaluation.

The compressed data corresponding to a positive evaluation may be compressed data corresponding to a captured image and a reproduced image for which an evaluation corresponding to a degree of approximation is a positive evaluation. The compressed data corresponding to a negative evaluation may be compressed data corresponding to a captured image and a reproduced image for which an evaluation corresponding to a degree of approximation is a negative evaluation.

The learning processing unit 36 may detect a boundary between a group of the compression parameter values of the plurality of compressed data corresponding to the positive evaluation and a group of the compression parameter values of the plurality of compressed data corresponding to the negative evaluation. Then, the learning processing unit 36 may perform the learning processing of the model 350 so that a compression parameter value to be applied in compression is between a compression parameter value, which is closest to the boundary, of the compression parameter values of the plurality of compressed data corresponding to the positive evaluation, and a compression parameter value, which is closest to the boundary, of the compression parameter values of the plurality of compressed data corresponding to the negative evaluation.

In step S25, the learning processing unit 36 determines whether the processing of steps S11 to S23 has been performed by a reference number of iterations. When it is determined that the processing has not been performed by the reference number of iterations (step S23: No), the processing proceeds to step S11. When it is determined that the processing has been performed by the reference number of iterations (step S23: Yes), the processing ends.

According to the above-described operations, since the compression parameter value is increased or decreased until a negative evaluation is acquired, it is possible to generate extreme compressed data (compressed image as an example, in the present embodiment) whose reproducibility is not deteriorated. Therefore, by changing the compression parameter value so as to reduce an amount of data of compressed data, it is possible to generate compressed data with good reproducibility and a small amount of data and to provide the same for learning processing.

In addition, the learning processing of the model 350 is performed by the learning processing unit 33 so that the compression parameter value to be applied in compression is between the compression parameter value of the compressed data corresponding to the positive evaluation and the compression parameter value of the compressed data corresponding to the negative evaluation. Therefore, by applying, to the compression, the compression parameter value output from the learned model 350, it is possible to generate extreme compressed data whose reproducibility is not deteriorated.

[2.2. Operating Step]

Figure 3:
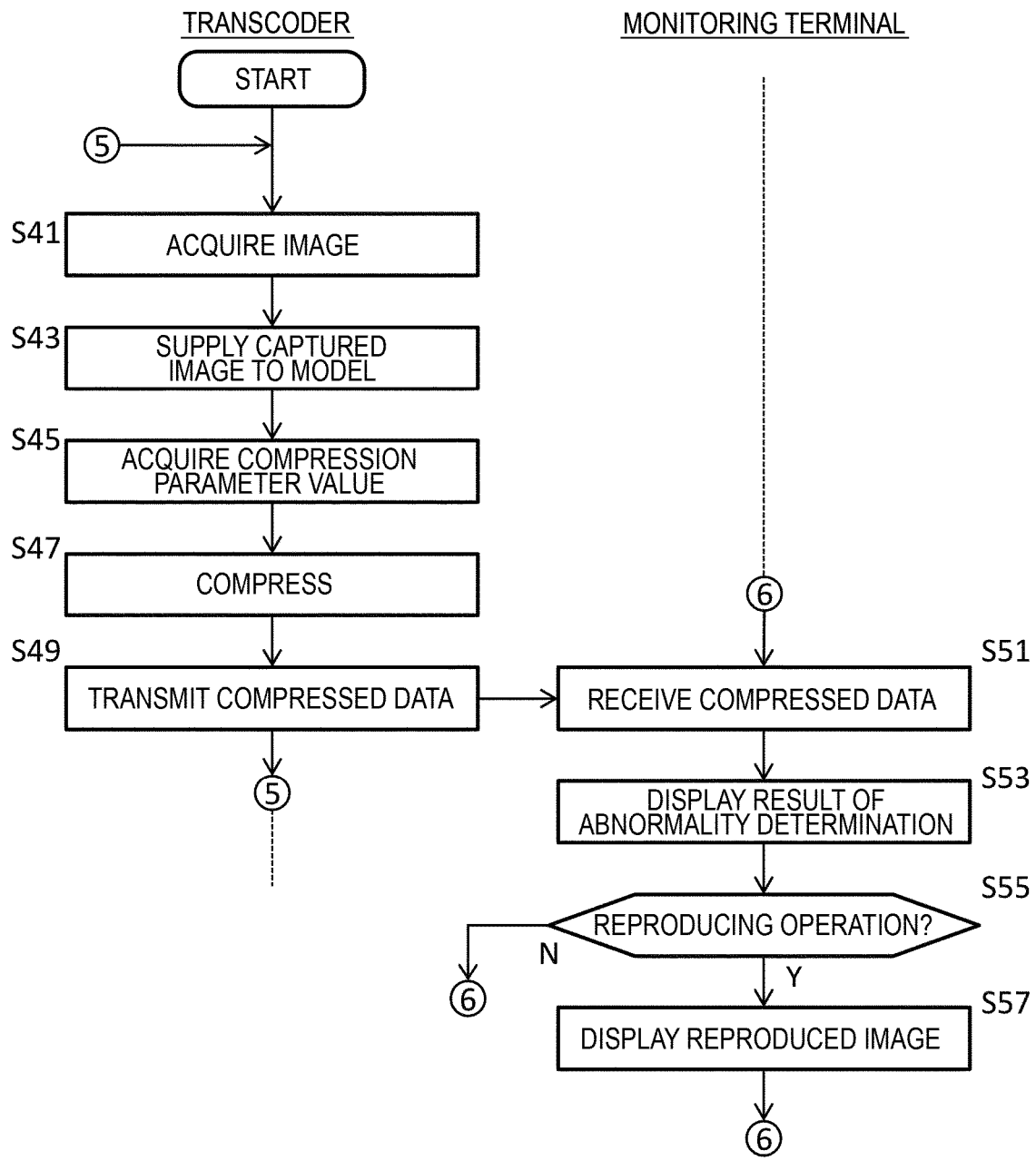
FIG. 3 shows an operation in an operating step of the security system 1 according to the embodiment.

FIG. 3 shows an operation in an operating step of the security system 1 according to the present embodiment. The security system 1 performs monitoring by using the learned model 350 by performing processing of steps S41 to S57.

First, in step S41, the image acquisition unit 30 acquires a captured image from each monitoring camera 2.

In step S43, the supply unit 37 supplies the captured images to the model 350. The supply unit 37 may supply the captured image of each monitoring camera 2 to the model 350. The supply unit 37 may supply, to the model 350, the captured image within a period for which it is not compressed, among the acquired captured images. For example, in a case where the processing of step S43 is first performed, the supply unit 37 may supply the entire captured images so far to the model 350. In a case where the processing of step S41 and thereafter are repeated and the processing of step S43 is iteratively performed, the supply unit 37 may supply, to the model 350, the captured image in a period after the captured image supplied in the previous processing of step S43.

In step S45, the supply unit 37 acquires the compression parameter value output from the model 350. The supply unit 37 may acquire the compression parameter value from the model 350 for each captured image, i.e., for each monitoring camera 2 that has captured the captured image.

In step S47, the compression unit 31 applies the compression parameter value from the supply unit 37 to compress the captured image. The compression unit 31 may perform compression by applying the compression parameter value, which is output from the model 350, in response to the input of the captured image, to the captured image.

In step S49, the transmission unit 38 transmits compressed data (compressed image as an example, in the present embodiment) to the monitoring terminal 4. Thereby, in step S51, the reception unit 40 of the monitoring terminal 4 receives the compressed data. When the processing of step S49 ends, the transcoder 3 may shift the processing to step S41.

In step S53, the determination unit 45 of the monitoring terminal 4 analyzes the compressed data (compressed image as an example, in the present embodiment) and determines whether an abnormality has occurred in the image capturing region. The determination unit 45 may cause the display unit 44 to display a determination result. In addition, when a detection target is detected in the image capturing region, the determination unit 45 may cause the display unit 44 to further display feature data thereof.

In step S55, the reproduction unit 42 of the monitoring terminal 4 determines whether an operation for displaying a reproduced image is performed. When it is determined in step S53 that the operation is not performed (step S55: No), the processing may proceed to step S51. When it is determined in step S53 that the operation has been performed (step S55: Yes), the processing may proceed to step S57.

In step S57, the reproduction unit 42 generates a reproduced image from the compressed data (compressed image as an example, in the present embodiment), and causes the display unit 44 to display the same. This allows the user to visually recognize the reproduced image and to check presence or absence of an abnormality. Note that, when the compressed data of the plurality of monitoring cameras 2 is supplied from the reception unit 40, the reproduction unit 42 may generate reproduced images from the compressed data, respectively, and cause the display unit 44 to display the same. When the processing of step S57 ends, the monitoring terminal 4 may shift the processing to the above-described processing of step S51.

3. Modified Embodiments

Note that, in the above-described embodiment, the transcoder 3 has been described as including the storage unit 35, the supply unit 37 and the transmission unit 38, but may not include one of them. For example, in a case where the transcoder 3 does not include the storage unit 35, the learning processing unit 36 may be configured to perform learning processing on the model 350 in an externally connected storage apparatus.

In addition, the compression unit 31 has been described as generating one compressed data from one captured image, but may generate a plurality of compressed data different from each other. For example, the compression unit 31 may be configured to generate a plurality of compressed data by applying separate compression parameter values to the captured images added with the same time stamp. In this case, the reproduction unit 32 may be configured to generate a reproduced image from each compressed data. Further, the evaluation acquisition unit 33 may be configured to acquire evaluations corresponding to degrees of approximation between the captured images and the plurality of reproduced images generated from the captured images. Thereby, the evaluation acquisition efficiency, and further, the learning efficiency of the model 350 can be improved.

In addition, the learning processing unit 36 has been described as performing the learning processing of the model 350 so that a compression parameter value to be applied in compression is between a compression parameter value of compressed data corresponding to a positive evaluation and a compression parameter value of compressed data corresponding to a negative evaluation, but may also be configured to perform the learning processing so that the compression parameter value becomes other value. For example, the learning processing unit 36 may be configured to perform the learning processing of the model 350 so that a compression parameter value to be applied in compression becomes a compression parameter value, which is closest to a compression parameter value corresponding to a negative evaluation, of compression parameter values of compressed data corresponding to a positive evaluation. As an example, the learning processing unit 36 may be configured to detect a boundary between a group of compression parameter values of a plurality of compressed data corresponding to a positive evaluation and a group of compression parameter values of a plurality of compressed data corresponding to a negative evaluation. Then, the learning processing unit 36 may be configured to perform the learning processing of the model 350 so that a compression parameter value to be applied in compression becomes a compression parameter value, which is closest to the boundary, of the compression parameter values of the plurality of compressed data corresponding to the positive evaluation.

Further, the compression unit 31 has been described as performing compression by applying the compression parameter value indicating at least one of the compression rate, the resolution, the number of gradations, or the frame rate. However, in addition to or instead of this, the compression unit may be configured to perform compression by applying a compression parameter value indicating an image effect. In other words, the compression unit 31 may be configured to perform compression by applying an image effect indicated by a compression parameter value to a captured image. For example, the image acquisition unit 30 may be configured to acquire a captured image captured under other image capturing condition different from the reference image capturing condition, and the compression unit 31 may be configured to generate, as compressed data, an image obtained by performing compression by applying an image effect corresponding to the reference image condition to the captured image. The image capturing condition may be a condition corresponding to a brightness of the image capturing region or the weather, the reference image capturing condition may be an image capturing condition under which a photographic subject is clearly image-captured (for example, an image capturing condition in fine weather during a day), and the other image capturing condition may be an image capturing condition under which a photographic subject may be unclearly image-captured (for example, an image capturing condition at night, snowfall, or rainfall). Applying an image effect corresponding to the reference image capturing condition to a captured image captured under the other image capturing condition different from the reference image capturing condition may mean removing an image effect corresponding to the other image capturing condition from the captured image or setting a captured image captured under the other image capturing condition to an image captured under the reference image capturing condition. As an example, the compression unit 31 may be configured to apply an image effect corresponding to an image capturing condition in fine weather to a captured image captured under an image capturing condition of snowfall and to generate a compressed image in which snow particles have been removed. When an image effect is applied according to the image capturing condition, the transcoder 3 may be provided with a sensing unit (not shown) configured to sense an image capturing condition of an image capturing region of each monitoring camera 2 and to provide the same to the compression unit 31, and the sensing unit may be provided with a brightness sensor, a thermometer, a rain gauge, an anemometer, and the like. Further, when an image effect is applied according to the image capturing condition, the transmission unit 38 may be configured to transmit, to the monitoring terminal 4, a compressed image and identification information indicating an image capturing condition of an image capturing region. Thereby, it is possible to notify the user of the monitoring terminal 4 that a feature of an image corresponding to the image capturing condition has disappeared due to compression.

Further, when an image effect is applied by the compression unit 31, according to an image capturing condition of an image capturing region, the reproduction unit 32 may be configured to generate, as a reproduced image, an image for which reproduction has been performed by applying, to an image of compressed data, an image effect corresponding to an image capturing condition (i.e., the other image capturing condition described above) of the image capturing region. An image, for which compression has been performed by applying an image effect corresponding to the reference image capturing condition to a captured image captured under the other image capturing condition different from the reference image capturing condition, is generated as compressed data, and an image for which reproduction has been performed by applying an image effect of the other image capturing condition to the image of the compressed data is generated as a reproduced image. Therefore, by using a degree of approximation between the reproduced image and the captured image and the compression parameter value applied to the compression in the learning processing, it is possible to generate compressed data with high reproducibility with respect to the captured image captured under the other image capturing condition different from the reference image capturing condition. Note that, the description 'reproduction is performed by applying an image effect' may mean performing reproduction by applying an image effect, or performing reproduction (as an example, reproduction performed by the reproduction unit 32 in the above embodiment) in addition to the applying of the image effect.

Further, the evaluation acquisition unit 33 has been described as acquiring the evaluation corresponding to the degree of approximation between the captured image and the reproduced image, but may also be configured to acquire an evaluation (also referred to as integrated evaluation) corresponding to the degree of approximation and an amount of data of compressed data. In this case, the compression unit 31 may be configured to acquire an amount of data of the compressed data and to supply the same to the evaluation acquisition unit 33. For example, the compression unit 31 may be configured to supply the amount of data of the compressed data to the evaluation acquisition unit 33 via the reproduction unit 32, and as an example, may be configured to supply the amount of data of the compressed data to the reproduction unit 32 together with the compressed data, and to cause the reproduction unit 32 to supply the amount of data of the compressed data to the evaluation acquisition unit 33 together with the reproduced image. In addition, in a case where the integrated evaluation corresponding to the degree of approximation and the amount of data of the compressed data is acquired by the evaluation acquisition unit 33, the learning processing unit 36 may be configured to perform learning processing by using the learning data including the integrated evaluation. Thereby, it is possible to generate compressed data with high reproducibility with respect to the original captured image and with a small amount of data. The integrated evaluation may be a negative evaluation, regardless of an evaluation corresponding to visibility, when the amount of data of the compressed data is larger than a preset allowable amount of data. In addition, when the amount of data of the compressed image is equal to or smaller than the allowable amount of data, the integrated evaluation may be the evaluation itself corresponding to the visibility. The integrated evaluation may be a binary value of a positive evaluation and a negative evaluation. The allowable amount of data may be set based on a communication band of the communication network 10, and as an example, may be an amount of data with which compressed images can be sequentially displayed on the monitoring terminal 4 without missing of information. Instead of this, the allowable amount of data may be set based on a communication fee in the communication network 10, and may be an amount of data in which a communication fee corresponding to a data communication amount is equal to or less than an allowable fee.

Further, the compression unit 31 has been described as generating a compressed image as compressed data, but may also be configured to generate a feature map of the captured image. The feature map may be data indicating features that are extracted in image recognition processing of the captured image, or may be data that is extracted in the middle of the image recognition processing. For example, the feature map may be a set (also referred to as a vector) of values that are output at an intermediate layer of a determination model (as an example, the model used by the determination unit 45 in the above-described embodiment) learned by deep learning so as to perform image recognition and to determine presence or absence of an abnormality in an image. Thereby, the amount of data of the compressed data can be reduced, as compared to a case where the compressed data is image data. In a case where the compression unit 31 generates a feature map, the compression unit 31 may be a part from an input layer to the intermediate layer of the above-described determination model, and the determination unit 45 of the monitoring terminal 4 may be a part from the intermediate layer to an output layer of the determination model. Thereby, the determination unit 45 can determine presence or absence of an abnormality from the feature map.

Here, when the feature map is generated as compressed data, the reproduction unit 32 may be configured to decompress (also referred to as expand) the compressed data to generate a reproduced image. In a case where the feature data is a vector output at the intermediate layer, the reproduction unit 32 may have a generative model configured to generate a reproduced image from the feature map. The generative model may be learned in advance by an algorithm using a machine learning or deep learning method represented by GAN (Generative Adversarial Network) or the like. The GAN is a generative adversarial network using a determination model configured to determine whether an input image is a captured image. In the GAN, learning of the determination model and learning of the generative model may be performed alternately. In the learning of the determination model, learning may be performed so that a determination result to the effect that the input image is not a captured image is output, in response to an input of a reproduced image to the determination model, and a determination result to the effect that the input image is a captured image is output, in response to an input of a captured image to the determination model. In the learning of the generative model, learning may be performed so that when a generated reproduced image is input to the determination model, a determination result to the effect that the input image is a captured image is output from the determination model.

Further, the learning processing unit 36 has been described as performing learning processing of the model 350 common to the plurality of monitoring cameras 2, but may also be configured to perform learning processing of the model 350 different for each monitoring camera 2.

Further, the apparatus has been described as a transcoder, but may also be other apparatus. For example, the apparatus may be a learning apparatus and may be configured to generate a learned model 350 and to supply the same to the transcoder.

In addition, various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied together with computer-readable instructions stored on computer-readable media, and/or processors supplied together with computer-readable instructions stored on computer-readable media. The dedicated circuitry may include a digital and/or analog hardware circuit, or may include an integrated circuit (IC) and/or a discrete circuit. The programmable circuitry may include a reconfigurable hardware circuit including logical AND, logical OR, logical XOR, logical NAND, logical NOR, and other logical operations, a memory element such as a flip-flop, a register, a field programmable gate array (FPGA) and a programmable logic array (PLA), and the like.

Computer-readable media may include any tangible device that can store instructions to be executed by a suitable device, and as a result, the computer-readable media having instructions to be stored in the device comprise an article of manufacture including instructions that can be executed to provide means for performing operations specified in the flowcharts or block diagrams. Examples of the computer-readable media may include an electronic storage medium, a magnetic storage medium, an optical storage medium, an electromagnetic storage medium, a semiconductor storage medium, and the like. More specific examples of the computer-readable media may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a BLU-RAY (registered trademark) disk, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code described in any combination of one or more programming languages, including an object oriented programming language such as Smalltalk (registered trademark), JAVA (registered trademark) and C++, and a conventional procedural programming language such as a 'C' programming language or similar programming languages.

Computer-readable instructions may be provided to a processor of a general purpose computer, a special purpose computer, or other programmable data processing apparatus, or to programmable circuitry, locally or via a local area network (LAN), wide area network (WAN) such as the Internet, and the like, and the computer-readable instructions may be executed so as to provide means for executing operations specified in the flowcharts or block diagrams. Examples of a processor include a computer processor, a processing unit, a microprocessor, a digital signal processor, a controller, a microcontrollers, and the like.

Figure 4:
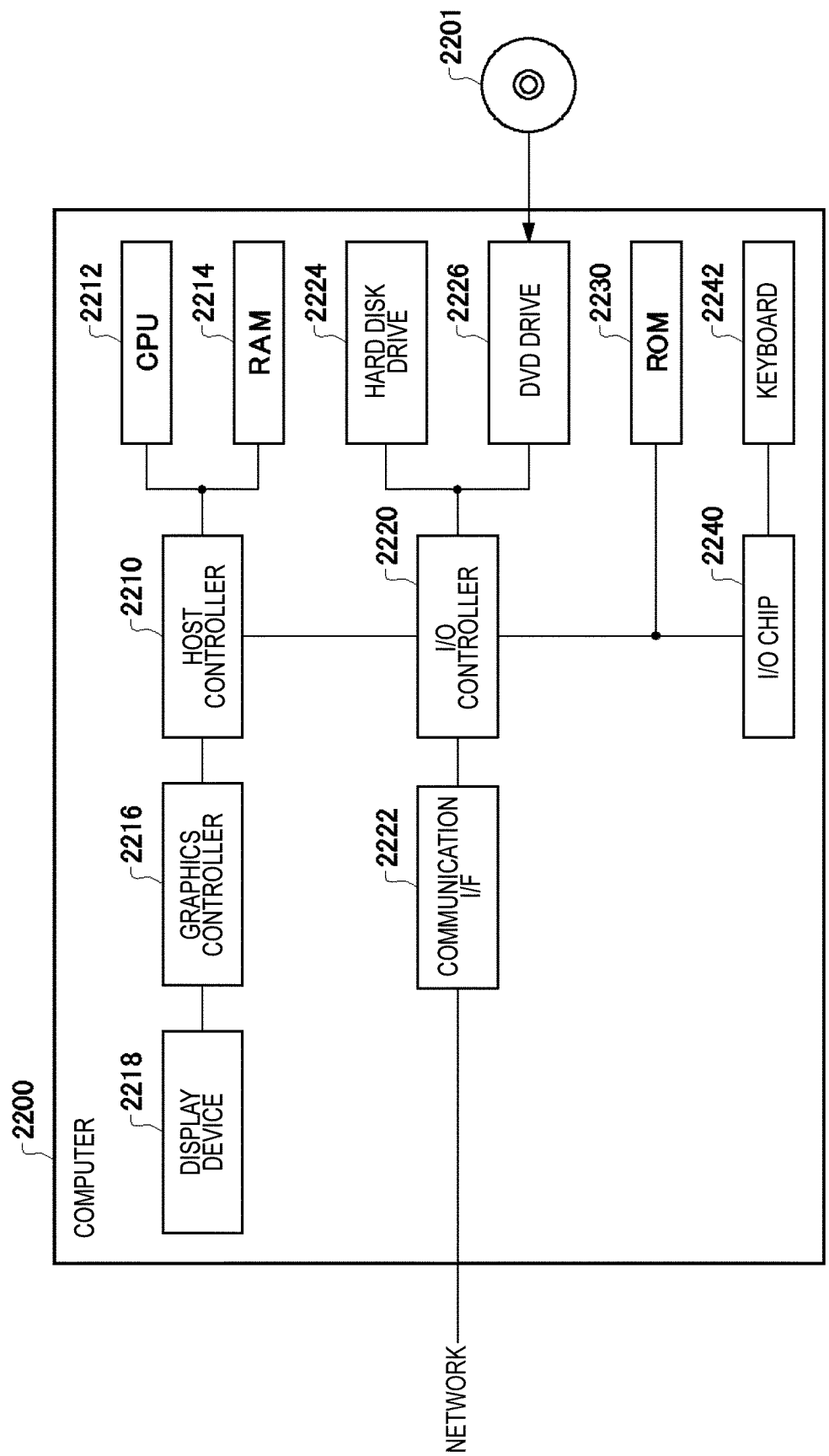
FIG. 4 shows an example of a computer 2200 in which a plurality of aspects of the present invention may be entirely or partially embodied.

FIG. 4 shows an example of a computer 2200 in which a plurality of aspects of the present invention may be entirely or partially implemented. A program that is installed in the computer 2200 can cause the computer 2200 to function as or execute operations associated with the apparatus of the embodiment of the present invention or one or more sections thereof, and/or cause the computer 2200 to execute the processes of the embodiment of the present invention or steps thereof. Such a program may be executed by a CPU 2212 so as to cause the computer 2200 to execute certain operations associated with some or all of the flowcharts and the blocks in the block diagrams described herein.

The computer 2200 according to the present embodiment includes the CPU 2212, a RAM 2214, a graphic controller 2216 and a display device 2218, which are mutually connected by a host controller 2210. The computer 2200 also includes input and output units such as a communication interface 2222, a hard disk drive 2224, a DVD-ROM drive 2226 and an IC card drive, which are connected to the host controller 2210 via an input and output controller 2220. The computer also includes legacy input and output units such as a ROM 2230 and a keyboard 2242, which are connected to the input and output controller 2220 via an input and output chip 2240.

The CPU 2212 is configured to operate according to programs stored in the ROM 2230 and the RAM 2214, thereby controlling each unit. The graphic controller 2216 is configured to acquire image data generated by the CPU 2212 on a frame buffer or the like provided in the RAM 2214 or in itself, and to cause the image data to be displayed on the display device 2218.

The communication interface 2222 is configured to communicate with other electronic devices via a network. The hard disk drive 2224 is configured to store programs and data that are used by the CPU 2212 within the computer 2200. The DVD-ROM drive 2226 is configured to read programs or data from a DVD-ROM 2201, and to provide the programs or data to the hard disk drive 2224 via the RAM 2214. The IC card drive is configured to read programs and data from an IC card, and/or to write programs and data into the IC card.

The ROM 2230 is configured to store therein a boot program or the like that is executed by the computer 2200 at the time of activation, and/or a program depending on the hardware of the computer 2200. The input and output chip 2240 may also be configured to connect various input and output units to the input and output controller 2220 via a parallel port, a serial port, a keyboard port, a mouse port and the like.

A program is provided by a computer-readable medium such as the DVD-ROM 2201 or the IC card. The program is read from the computer-readable medium, is installed into the hard disk drive 2224, the RAM 2214 or the ROM 2230, which are also examples of the computer-readable medium, and is executed by the CPU 2212. Information processing described in these programs is read into the computer 2200, resulting in cooperation between the programs and the various types of hardware resources described above. An apparatus or method may be constituted by realizing the operation or processing of information according to a use of the computer 2200.

For example, when communication is performed between the computer 2200 and an external device, the CPU 2212 may be configured to execute a communication program loaded onto the RAM 2214 to instruct the communication interface 2222 for communication processing, based on processing described in the communication program. The communication interface 2222 is configured, under control of the CPU 2212, to read transmission data stored on a transmission buffer processing region provided in a recording medium such as the RAM 2214, the hard disk drive 2224, the DVD-ROM 2201, or the IC card, and to transmit the read transmission data to a network or to write reception data received from the network to a reception buffer processing region or the like provided on the recording medium.

In addition, the CPU 2212 may be configured to cause all or a necessary portion of a file or a database, which has been stored in an external recording medium such as the hard disk drive 2224, the DVD-ROM drive 2226 (DVD-ROM 2201), the IC card and the like, to be read into the RAM 2214, thereby executing various types of processing on the data on the RAM 2214. Next, the CPU 2212 is configured to write the processed data back to the external recording medium.

Various types of information, such as various types of programs, data, tables, and databases, may be stored in the recording medium and may be subjected to information processing. The CPU 2212 may be configured to execute, on the data read from the RAM 2214, various types of processing including various types of operations, processing of information, conditional judgment, conditional branching, unconditional branching, search and replacement of information and the like described in the present disclosure and specified by instruction sequences of the programs, and to write a result back to the RAM 2214. In addition, the CPU 2212 may be configured to search for information in a file, a database, and the like in the recording medium. For example, when a plurality of entries, each having an attribute value of a first attribute associated with an attribute value of a second attribute, is stored in the recording medium, the CPU 2212 may be configured to search for an entry having a specified attribute value of the first attribute that matches a condition from the plurality of entries, and to read the attribute value of the second attribute stored in the entry, thereby acquiring the attribute value of the second attribute associated with the first attribute that satisfies a predetermined condition.

The program or software modules described above may be stored in the computer-readable medium on the computer 2200 or near the computer 2200. In addition, a recording medium such as a hard disk or a RAM provided in a server system connected to a dedicated communication network or the Internet can be used as a computer-readable medium, thereby providing the programs to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, stages and the like of each process performed by an apparatus, system, program, and method shown in the claims, embodiments, or diagrams can be performed in any order as long as the order is not indicated by 'prior to,' 'before,' or the like and as long as the output from a previous process is not used in a later process. Even if the process flow is described using phrases such as 'first' or 'next' in the claims, embodiments, or diagrams, it does not necessarily mean that the process must be performed in this order.

EXPLANATION OF REFERENCES

1: security system
2: monitoring camera
3: transcoder
4: monitoring terminal
10: communication network
30: image acquisition unit
31: compression unit
32: reproduction unit
33: evaluation acquisition unit
35: storage unit
36: learning processing unit
37: supply unit
38: transmission unit
40: reception unit
42: reproduction unit
44: display unit
45: determination unit
350: model
351: image file
2200: computer
2201: DVD-ROM
2210: host controller
2212: CPU
2214: RAM
2216: graphic controller
2218: display device
2220: input and output controller
2222: communication interface
2224: hard disk drive
2226: DVD-ROM drive
2230: ROM
2240: input and output chip
2242: keyboard

What is claimed is:

1. An apparatus comprising:
an image acquisition unit configured to acquire a captured image;
a compression unit configured to perform compression of a captured image using at least one compression parameter having a compression parameter value to compress the captured image to generate compressed data;
a reproduction unit configured to generate, from the compressed data, a reproduced image that reproduces the captured image;
an evaluation acquisition unit configured to acquire an evaluation corresponding to a degree of approximation between the reproduced image and the captured image; and
a learning processing unit configured to perform learning processing of a model configured to output, in response to an input of a new captured image, a compression parameter value to be applied in compression of the new captured image, by using learning data including the evaluation, a captured image corresponding to the evaluation, and a compression parameter value applied in compression of the captured image corresponding to the evaluation, wherein
the image acquisition unit is configured to acquire a captured image captured under other image capturing condition different from a reference image capturing condition,
the compression unit is configured to generate, as the compressed data, an image for which compression has been performed by applying an image effect corresponding to the reference image capturing condition to the captured image, and
the reproduction unit is configured to generate, as the reproduced image, an image for which reproduction has been performed by applying an image effect corresponding to the other image capturing condition to an image of the compressed data.

2. The apparatus according to claim 1, wherein
the captured image is a captured moving image,
the compression unit is configured to generate, as the compressed data, a moving image obtained by thinning out frames from the captured moving image, and
the reproduction unit is configured to generate, as the reproduced image, a moving image that reproduces the thinned-out frames.

3. The apparatus according to claim 1, wherein
the compression unit is configured to irreversibly compress the captured image to generate the compressed data.

4. The apparatus according to claim 1, wherein
the compression unit is configured to sequentially change the compression parameter value to sequentially generate compressed data corresponding to each compression parameter value.

5. The apparatus according to claim 1, wherein
the learning processing unit is configured to perform learning processing of the model so that a compression parameter value to be applied in compression is between a compression parameter value of the compressed data corresponding to the evaluation, which is positive, and a compression parameter value of the compressed data corresponding to the evaluation, which is negative.

6. A method comprising:
acquiring a captured image;
performing compression of the captured image using at least one compression parameter having a compression parameter value to compress the captured image to generate compressed data;
generating, from the compressed data, a reproduced image that reproduces the captured image;
acquiring an evaluation corresponding to a degree of approximation between the reproduced image and the captured image;

performing learning processing of a model configured to output, in response to an input of a new captured image, a compression parameter value to be applied in compression of the new captured image, by using learning data including the evaluation, a captured image corresponding to the evaluation, and a compression parameter value applied in compression of the captured image corresponding to the evaluation;

acquiring a captured image captured under other image capturing condition different from a reference image capturing condition;

generating, as the compressed data, an image for which compression has been performed by applying an image effect corresponding to the reference image capturing condition to the captured image; and generating, as the reproduced image, an image for which reproduction has been performed by applying an image effect corresponding to the other image capturing condition to an image of the compressed data.

7. A non-transitory, computer-readable medium having recorded thereon a program configured to cause a computer to function as:

an image acquisition unit configured to acquire a captured image;

a compression unit configured to perform compression of a captured image using at least one compression parameter having a compression parameter value to compress the captured image to generate compressed data;

a reproduction unit configured to generate, from the compressed data, a reproduced image that reproduces the captured image;

an evaluation acquisition unit configured to acquire an evaluation corresponding to a degree of approximation between the reproduced image and the captured image; and a learning processing unit configured to perform learning processing of a model configured to output, in response to an input of a new captured image, a compression parameter value to be applied in compression of the new captured image, by using learning data including the evaluation, a captured image corresponding to the evaluation, and a compression parameter value applied in compression of the captured image corresponding to the evaluation, wherein the image acquisition unit is configured to acquire a captured image captured under other image capturing condition different from a reference image capturing condition, the compression unit is configured to generate, as the compressed data, an image for which compression has been performed by applying an image effect corresponding to the reference image capturing condition to the captured image, and the reproduction unit is configured to generate, as the reproduced image, an image for which reproduction has been performed by applying an image effect corresponding to the other image capturing condition to an image of the compressed data.

* * * * *